GEORGE HILL.
Improvement in Corn-Harrows.
No. 115,055. Patented May 23, 1871.
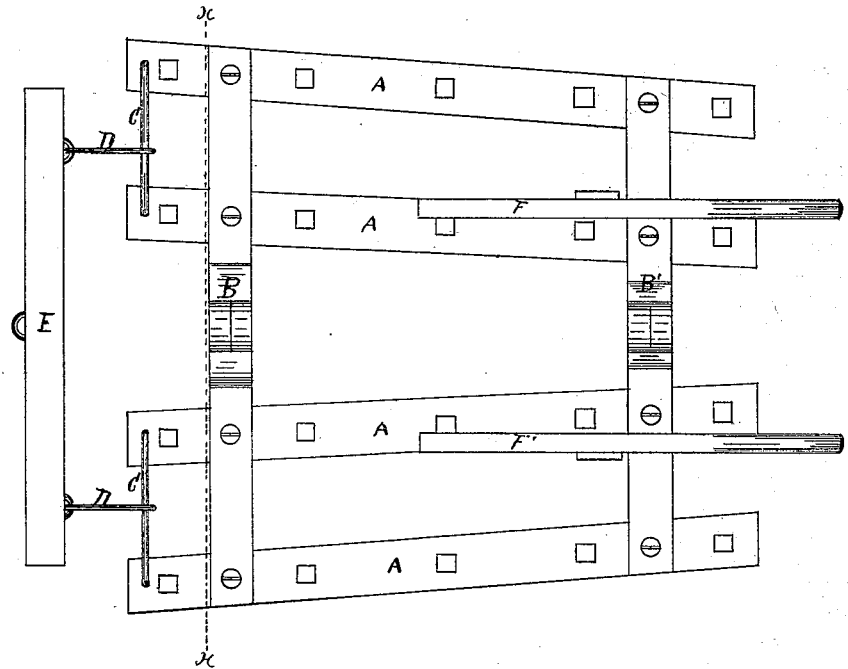
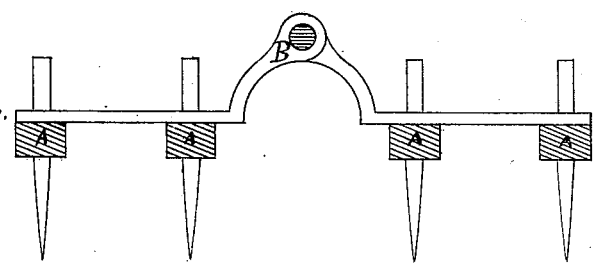
Witnesses
Ch. H. Sherburne
N. C. Gridley
Inventor
George Hill
By Farwell &co
his Attys

UNITED STATES PATENT OFFICE.

GEORGE HILL, OF GALVA, ILLINOIS.

IMPROVEMENT IN CORN-HARROWS.

Specification forming part of Letters Patent No. 115,055, dated May 23, 1871.

*To all whom it may concern:*

Be it known that I, GEORGE HILL, of Galva, county of Henry and State of Illinois, have invented a new and useful Improvement in Corn-Harrows; and I do hereby declare the following to be a full, clear, and exact description thereof, which will enable others skilled in the art to which my invention appertains to make and use the same, reference being had to the accompanying drawing forming part of this specification, in which—

Figure 1 is a plan or top view of my improved harrow; and Fig. 2 is a vertical transverse section of the same taken on line x x.

Similar letters of reference indicate corresponding parts in both figures of the drawing.

The object of my invention is to provide a harrow by the use of which corn may be properly cultivated when small without danger of covering or breaking the same, thus obviating the difficulty arising from the use of the ordinary cultivator or common plow; and the improvement consists in the employment of hinges, by which the separate parts of the frame are connected laterally, the said hinges being curved upward between the inner sides of the frames in such a manner as to pass over the hills of corn, thus enabling the teeth of the harrow to come in close proximity to the hills upon each side of the rows; also, in providing the front end of the separate frames with transverse rods, upon which are secured rods or chains connected to the sway-bar, to which the whiffletrees are attached, the whole being arranged to operate together with the hinges, whereby the separate frames are adjusted to the uneven surface of the ground.

In the accompanying drawing, A A A A are the drag-bars, which are provided with metal teeth in the ordinary manner. B B' are the hinges, to which the several drag-bars are firmly attached, said hinges being curved upward in the center from the inner sides of the center lines to the point of their connection, as shown in Fig. 2. C C' are transverse rods, which are firmly affixed to the front extremities of the bars, and upon which are loosely fitted rods or chains D D, which extend forward and are hinged or otherwise loosely secured to the rear side of the sway-bar E. Thus, as the same are drawn forward, the drag-bars adjust themselves to the surface of the ground, the arrangement of the hinges, together with the manner of attaching the sway-bar, being such as to admit of such movement. F F' are the handles for guiding the harrow, which are firmly attached to the center drag-bars in the usual manner.

Having thus described my invention, what I claim as new, and desire to secure by Letters Patent, is—

The combination of hinges B B', when constructed and attached as described, drag-bars A A A A, rods C C', chains or rods D D', sway-bar E, and handles F F', the whole constructed and arranged to operate substantially in the manner and for the purpose described.

GEORGE HILL.

Witnesses:
MILTON M. FORD,
SAMUEL M. ELDRIDGE.